(12) United States Patent
Levinsky

(10) Patent No.: US 11,728,048 B2
(45) Date of Patent: Aug. 15, 2023

(54) NUCLEAR FUEL RODS AND HEAT PIPES IN A GRAPHITE MODERATOR MATRIX FOR A MICRO-REACTOR, WITH THE FUEL RODS HAVING FUEL PELLETS IN A BEO SLEEVE

(71) Applicant: Westinghouse Electric Company LLC, Cranberry Township, PA (US)

(72) Inventor: Alex Levinsky, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/108,602

(22) Filed: Dec. 1, 2020

(65) Prior Publication Data

US 2022/0172852 A1 Jun. 2, 2022

(51) Int. Cl.
*G21C 5/06* (2006.01)
*G21C 3/07* (2006.01)
*G21C 15/257* (2006.01)

(52) U.S. Cl.
CPC ............ *G21C 5/06* (2013.01); *G21C 3/07* (2013.01); *G21C 15/257* (2013.01)

(58) Field of Classification Search
CPC .......... G21C 5/06; G21C 15/257; G21C 3/07; G21C 3/3245
USPC ........................................ 376/367, 427, 458
See application file for complete search history.

(56) References Cited

U.S. PATENT DOCUMENTS

| 3,291,696 A | 12/1966 | Sugimoto et al. |
| 3,293,138 A | 12/1966 | Schulten |
| 4,273,613 A * | 6/1981 | Radkowsky ......... G21C 19/205 376/267 |
| 5,715,290 A * | 2/1998 | Uetake ................. G21C 19/307 376/267 |
| 9,593,684 B2 | 3/2017 | Shargots et al. |
| 2013/0058448 A1* | 3/2013 | Smith .................... G21C 17/10 376/245 |
| 2016/0329113 A1 | 11/2016 | El-Genk |
| 2017/0352436 A1 | 12/2017 | Hyde et al. |

FOREIGN PATENT DOCUMENTS

TW 201314704 A 4/2013

OTHER PUBLICATIONS

Joo, "VHTR Numerical Benchmark Based on the Compact Nuclear Power Source Experiments", In Proceedings of Joint International Topical Meeting on Mathematics & Computation and Supercomputing in Nuclear Applications, pp. 15-19. 2007. (Year: 2007).*

Kozier, "The Nuclear Battery: a solid-state, passively cooled reactor for the generation of electricity and/or high-grade steam heat", Whiteshell Nuclear Research Establishment, 1988. (Year: 1988).*

(Continued)

*Primary Examiner* — Jack W Keith
*Assistant Examiner* — Daniel Wasil
(74) *Attorney, Agent, or Firm* — K&L Gates LLP

(57) ABSTRACT

A reactor unit cell is disclosed including a graphite moderator structure, a heat pipe positioned in the graphite moderator structure, and a fuel assembly positioned in the graphite moderator structure. The fuel assembly comprises at least one fuel rod. Each fuel rod comprises a beryllium-oxide sleeve and nuclear fuel positioned in the beryllium-oxide sleeve.

22 Claims, 3 Drawing Sheets

(56) References Cited

OTHER PUBLICATIONS

Snead, "Use of beryllium and beryllium oxide in space reactors", In AIP Conference Proceedings, vol. 746, No. 1, pp. 768-775. American Institute of Physics, 2005. (Year: 2005).*
International Search Report and Written Opinion for International PCT Application No. PCT/US2021/072638, dated Apr. 19, 2022.
Search Report for Taiwan Patent Application No. 110144922, dated Aug. 23, 2022.

* cited by examiner

NUCLEAR FUEL RODS AND HEAT PIPES IN A GRAPHITE MODERATOR MATRIX FOR A MICRO-REACTOR, WITH THE FUEL RODS HAVING FUEL PELLETS IN A BEO SLEEVE

GOVERNMENT CONTRACT

This invention was made with government support under Contract DE-NE0008853 awarded by the Department of Energy. The government has certain rights in the invention.

BACKGROUND

This invention relates generally to nuclear reactors, such as small modular reactors (SMRs) and micro-reactors.

The electricity energy market can be divided into centralized and decentralized. The centralized market is based on large (in the range of hundreds of MWe) power generators and high capacity dense transmission and distribution networks. The decentralized or off-grid market relies instead on compact power generators (<15 MWe) usually connected to small localized distribution networks or micro-grids. Currently, remote artic communities, remote mines, military bases and island communities are examples of decentralized markets. At present, the energy in off-grid markets is predominately provided by diesel generators. This leads to high costs of electricity, fossil fuel dependency, load restrictions, complicated fuel supply logistics and aging infrastructure. The stringent requirements of off-grid markets include affordability, reliability, flexibility, resiliency, sustainability (clean energy), energy security, and rapid installation and minimum maintenance efforts. All these demands can be addressed with nuclear energy.

Micro-reactors are nuclear reactors that are capable of generating less than 10 MWe and capable of being deployed for remote application. These micro-reactors can be packaged in relatively small containers, operate without active involvement of personnel, and operate without refueling/replacement for a longer period than conventional nuclear power plants.

One such micro-reactor is the eVinci Micro Reactor system, designed by Westinghouse Electric Company. These micro-reactors can be packaged in relatively small containers, operate without active involvement of personnel, and operate without refueling/replacement for a longer period than conventional nuclear power plants. Other examples of micro-reactors are described in commonly owned U.S. Provisional Application Publication No. 62/984,591, titled "HIGH TEMPERATURE HYDRIDE MODERATOR ENABLING COMPACT AND HIGHER POWER DENSITY CORES IN NUCLEAR MICRO-REACTORS", as well as in U.S. patent application Ser. No. 14/773,405, titled "MOBILE HEAT PIPE COOLED FAST REACTOR SYSTEM, which published as U.S. Patent Application Publication No. 2016/0027536, both of which are hereby incorporated by reference in their entireties herein.

Referring to FIG. 1, a cross-sectional view of an example micro-reactor 100 is provided. The micro-reactor 100 can include a core 102 that houses fuel, moderator channels, heat pipes and reactivity control channels (shutdown rods). The fuel can be encapsulated in the core 102 while the heat pipes can extend outside of the core 102 to a secondary side of the micro-reactor 100 so as to allow for extraction of heat generated by the fuel.

In one aspect, the core 102 can be surrounded by axial and radial reflectors. As shown in FIG. 1, six reactivity control drums 106 can be embedded in the radial reflector 118. In various other embodiments, the core 102 can be surrounded with more than six control drums 106, such as twelve control drums 106, as an example. Each of control drums 106 can include a reflecting part 108 and an absorbing part 110. In use, the control drums 106 can be rotatable between a reflecting position, where the reflecting part 108 of the control drum faces the monolith core 102, increasing reactivity within the core, and an absorbing position, wherein the absorbing part 110 faces the core 102, reducing reactivity within the core. These reflectors can be housed within a plurality of housings that can include a structural container 112, a neutron absorber vessel 122, and a boron carbide, or gamma, neutron shield 114. In addition, an air gap 116 can be provided between the neutron absorber vessel 122 and the boron carbide shield 114 for shield cooling and gamma shielding. All these components can be placed inside of an outer structural canister 120.

From a technical and business perspective, it is required that the reactor core meet multiple criterion. One such criteria is that the reactor core be neutronically flexible and can be usable with various moderator combinations, such as a strictly graphite moderator, a graphite moderator with beryllium-oxide (BeO) moderator pins, such as is described in co-owned U.S. patent application Ser. No. 17/080,241, entitled "ENHANCED GRAPHITE NEUTRON REFLECTOR WITH BERYLLIUM OXIDE INCLUSIONS", filed Oct. 26, 2020, which is hereby incorporated by reference in its entirety herein, or a graphite moderator with YHx or ZrHx moderator pins. Another criteria is that the reactor core be self-sufficient from the thermo-mechanical point of view, such as being resilient enough account for heat removal reduction when there is heat pipe failure. Another criteria is that the reactor core be able to support available manufacturing capabilities. Another criteria is that the reactor core be able to be integrated with other core components, such as radial reflectors (like the control drums), so as to form a reactor core that is compact and can be transported as a unit maintaining the initial geometry. Another criteria is that the reactor core be able to be used for transportable, stationary, and mobile reactors.

In addition to meeting the above-described criteria, some applications require an even more compact reactor core size. At the same time, simplification of fuel handling and reactor assembling is desirable.

In addition to the above, some nuclear reactors utilize Tri-structural Isotropic ("TRISO") fuel particles. In instances where TRISO fuel is utilized, there are concerns regarding protection of the TRISO fuel from migration of the several metal isotopes from the heat pipes due to diffusion processes. These isotopes, more particularly nickel, can compromise a silicon carbide layer in the TRISO particle, which can lead to the release of fission products and gasses from the TRISO kernel. In addition to the above-described criteria regarding the reactor core design, minimization of the amount of fuel and corresponding costs associated therewith are very important when considering reactor designs.

It would therefore be desirable to identify a reactor core modification that helps address some, if not all, of the above-described technical issues and requirements and, at the same time, preserve the developed unit cell and core designs

SUMMARY

In various embodiments, a reactor unit cell is disclosed including a graphite moderator structure, a heat pipe positioned in the graphite moderator structure, and a fuel assembly positioned in the graphite moderator structure. The fuel assembly comprises a beryllium-oxide sleeve and nuclear fuel positioned in the beryllium-oxide sleeve.

In various embodiments, a reactor unit cell is disclosed including a graphite moderator matrix, a heat pipe positioned in the graphite moderator matrix, and a plurality of fuel assemblies positioned in the graphite moderator matrix. The plurality of fuel assemblies surround the heat pipe. At least one fuel assembly of the plurality of fuel assemblies includes a sleeve comprised of a beryllium-based material and nuclear fuel positioned in the sleeve.

In various embodiments, a nuclear reactor core is disclosed including a plurality of reactor unit cells. At least one of the reactor unit cells includes a graphite moderator matrix, a plurality of heat pipes positioned in the graphite moderator matrix, and a plurality of fuel assemblies positioned in the graphite moderator matrix. At least one fuel assembly of the plurality of fuel assemblies includes a beryllium-oxide sleeve configured to house nuclear fuel therein.

BRIEF DESCRIPTION OF THE DRAWINGS

Various features of the embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Numerous specific details are set forth to provide a thorough understanding of the overall structure, function, manufacture, and use of the embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the claims.

Figure 1:
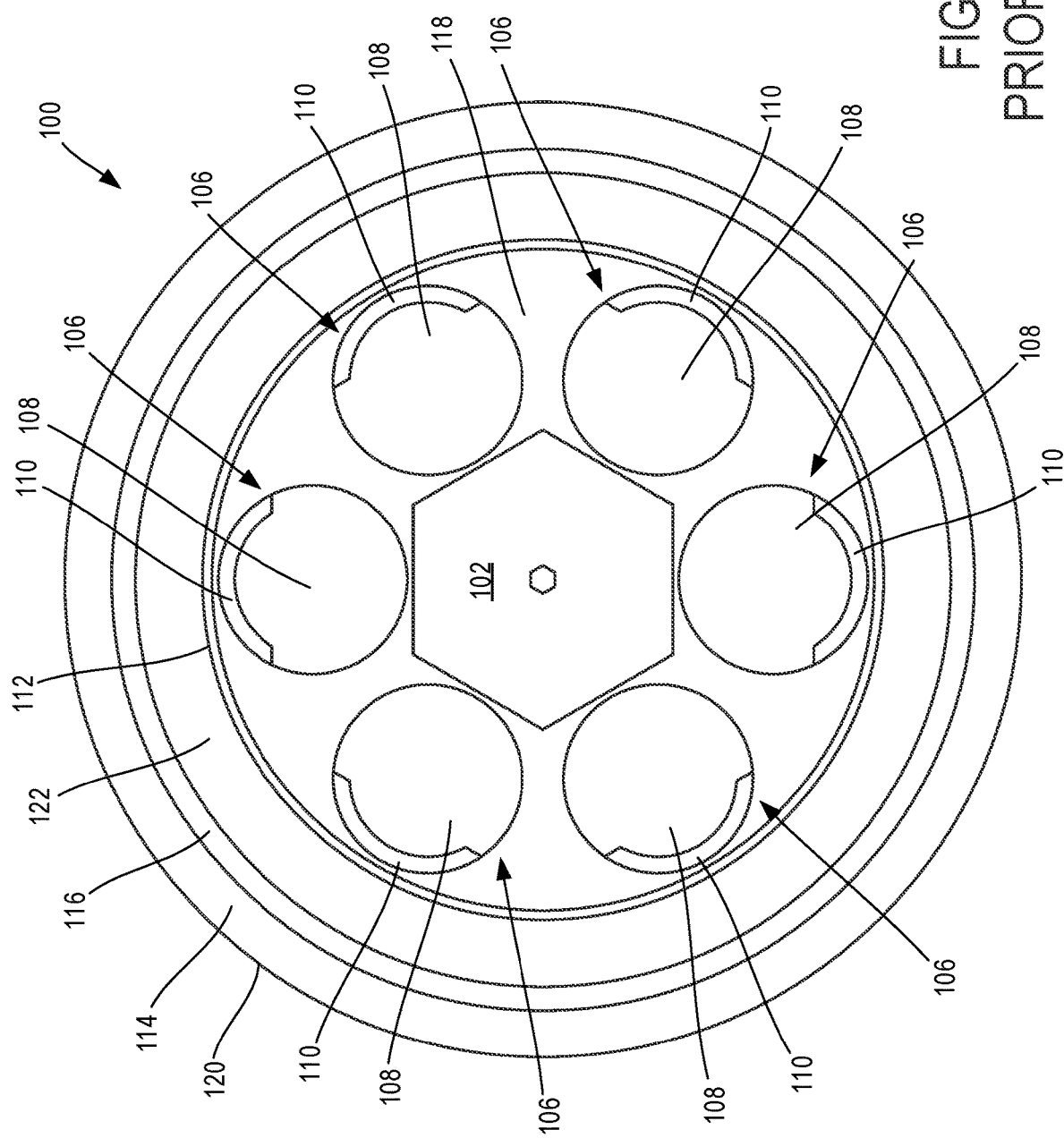
FIG. 1 illustrates an exemplary micro-reactor.
Figure 2:
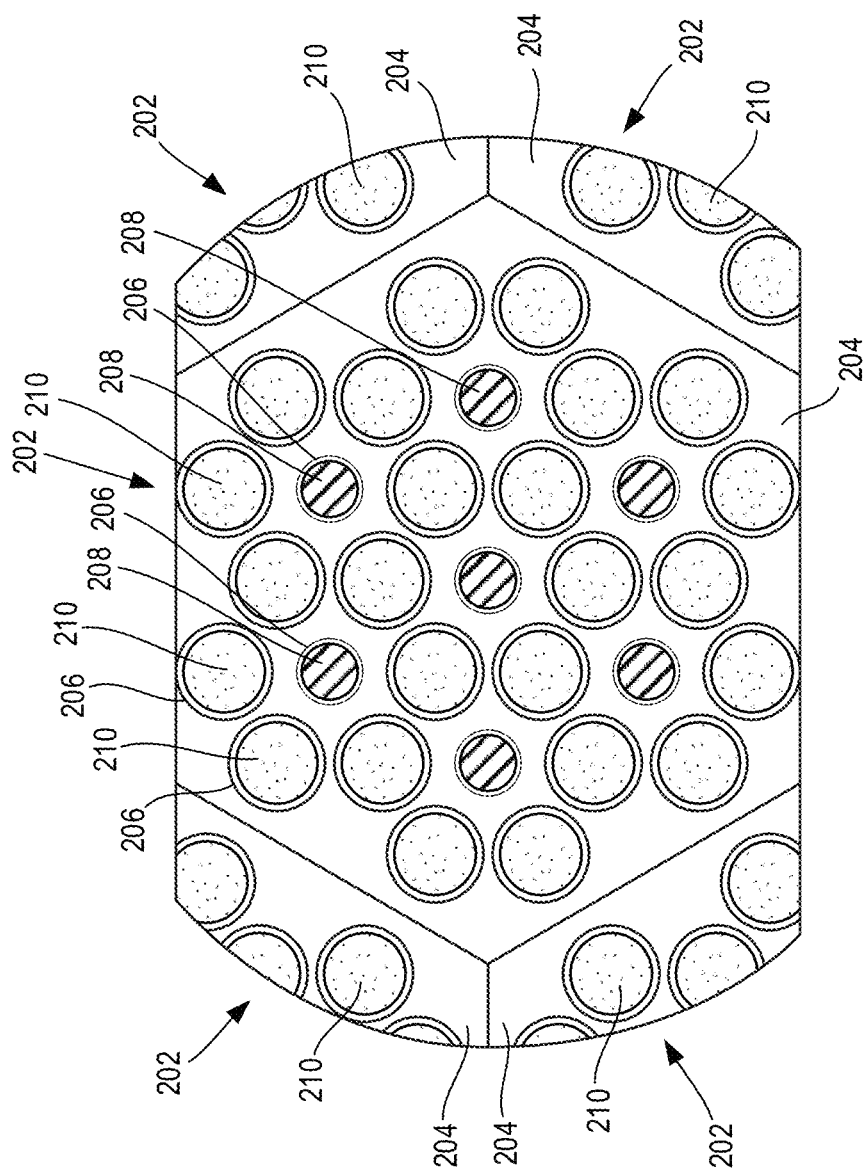
FIG. 2 illustrates a plurality of reactor unit cells of an enhanced reactor core, according to at least one aspect of the present disclosure.

Referring now to FIG. 2, a portion of an enhanced reactor core 200 is provided, according to at least one aspect of the present disclosure. The reactor core 200 can include a plurality of reactor unit cells 202 adjacently positioned relative to one another within the reactor core 200. In one aspect, the reactor unit cells 202 can be similar to the reactor core blocks described in U.S. Provisional Application No. 62/984,591, incorporated by reference hereinabove. While five reactor unit cells 202 are shown and described, it should be understood that any number of reactor unit cells 202 can be included within the reactor core 200.

In various embodiments, each of the reactor unit cells 202 can include a graphite moderator structure, or matrix 204. In one aspect, the graphite moderator structure 204 can be of unitary construction. In another aspect, the graphite moderator structure 204 can be comprised of a plurality of smaller graphite support structure components assembled together to form the graphite moderator structure 204. The graphite moderator structure 204 can define a plurality of channels 206 that can sized to receive a plurality of heat pipes 208 and a plurality of fuel assemblies 210 therein, as will be described in more detail below. As shown in FIG. 2, only a few of the channels 206, heat pipes 208, and fuel assemblies 210 are pointed to.

As shown in FIG. 2, the channels 206 in the graphite support structure 204 can be arranged such that a plurality of fuel assemblies 210 surround a single heat pipe 208. As one example, as is shown in FIG. 2, the channels 206 can be arranged such that six fuel assemblies 210 surround one heat pipe 208. Other embodiments are envisioned where more than six fuel assemblies 210 surround one heat pipe 208, such as eight, ten, or twelve fuel assemblies 210. Other example embodiments are envisioned where less than six fuel assemblies 210 surround one heat pipe 208, such as five, four, or three fuel assemblies 210. In one example embodiment, the number of fuel assemblies 210 to the number of heat pipes 208 per reactor unit cell can be 24:7, as shown in FIG. 2. Other example embodiments are envisioned where the number of fuel assemblies 210 to the number of heat pipes 208 is greater than 24:7, such as about 4:1, 5:1, 6:1, or 7:1, as examples. Other example embodiments are envisioned where the number of fuel assemblies 210 to the number of heat pipes 208 is less than 24:7, such as about 3:1, 2.5:1, or 2:1, as examples. Other example embodiments are envisioned where the channels 206 are arranged such that a plurality of fuel assemblies 210 surround more than one heat pipe 208.

Figure 3:
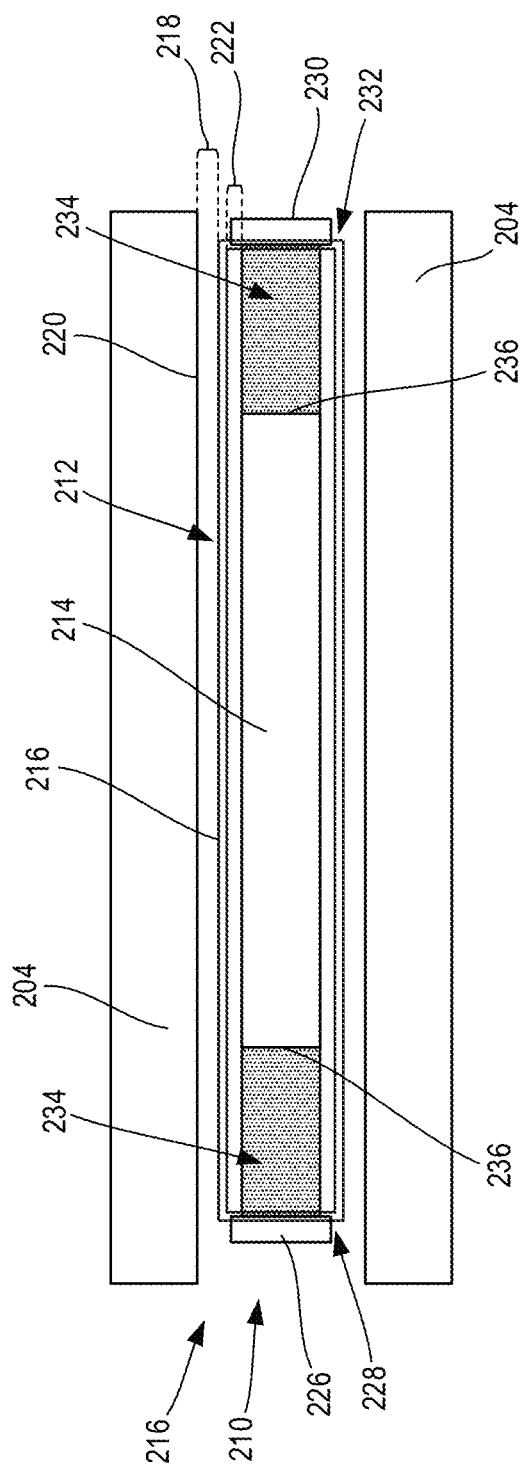
FIG. 3 illustrates a side view of a sleeve housing nuclear fuel, according to at least one aspect of the present disclosure.

Referring now to FIGS. 2 and 3, each of the fuel assemblies 210 can include a cylindrical sleeve 212 that can be positioned in the channels 206 defined by the graphite moderator structure 204. In addition, each of the fuel assemblies 210 can include nuclear fuel 214 positioned within the sleeves 212. In various embodiments, the sleeve 212 being positioned in the channels 206 such that at least a portion of the sleeve 212 is radially encompassed by the channels 206 while another portion of the sleeve 212 may be radially unencompassed by the channels 206. Stated another way, the sleeve 212 can be positioned in the channels 206 such that at least a portion of the sleeve 212 is radially encompassed within the graphite support structure 204 while another portion of the sleeve 212 extends out of the graphite support structure 204. In various other embodiments, such as is shown in FIG. 3, the sleeve 212 can be positioned in the channels 206 such that the sleeve 212 is completely radially encompassed by the channel 206.

In various embodiments, the sleeves 212 can be comprised of a beryllium-based material, such as beryllium-oxide (BeO) or beryllium carbide (Be2C), as examples. The positioning of beryllium-based sleeves 212 around the nuclear fuel 214 is very beneficial from a neutronics viewpoint. For example, beryllium-based materials provide neutron moderation to the nuclear fuel 214, as well as provide some reactivity contribution from (n, 2n) reaction for neutrons with energy above ~1.8 MeV.

In one aspect, the sidewalls 216 of the sleeves 212 can have a wall thickness that is defined based on needed moderation of the nuclear fuel 214, as well consideration of temperature gradients and stresses within the reactor core 200. In several example embodiments, the sidewalls 216 can have a wall thickness in the range of about 0.15 cm to about 0.4 cm. Various other embodiments are envisioned where the sidewall 216 thickness can be greater than 0.4 cm, such as 0.5 cm, 0.6 cm, or 0.7 cm, as examples. Various other embodiments are envisioned where the sidewall 216 thickness can be less than 0.15 cm, such as 0.125 cm, 0.1 cm, or 0.075 cm, as examples.

As shown best in FIG. 3, a first radial gap 218 can be defined between the sidewalls 216 of the sleeves 212 and inner edges 220 the channels 206 of the graphite support structure 204 that the sleeves 212 are positioned in. In one aspect, the first radial gap 218 size can be defined based on considerations of beryllium-based material swelling and graphite shrinkage under irradiation and relative thermal expansion of beryllium-based materials and graphite. In various embodiments, the first radial gap 218 can be in the range of about 0.1 cm to about 0.2 cm.

Various other embodiments are envisioned where the first radial gap 218 can be greater than 0.2 cm, such as 0.25 cm, 0.3 cm, or 0.4 cm, as examples. Various other embodiments are envisioned where the first radial gap 218 can be less than 0.1 cm, such as 0.75 cm, 0.5 cm, or 0.25 cm, as examples.

Continuing to refer to FIGS. 2 and 3, as referenced above, the fuel assemblies 210 can include nuclear fuel 214 positioned within the sleeves 212. In various embodiments, the nuclear fuel 214 can comprise TRISO fuel. In various embodiments, the nuclear fuel 214 can include any other suitable nuclear fuel usable in nuclear reactors, such as uranium-based fuels like UN, as an example. As shown best in FIG. 3, a second radial gap 222 can be defined between the sidewalls 216 of the sleeves 212 and the radials edges 224 the nuclear fuel 214. In one aspect, the second radial gap 222 size can be defined based on considerations of fuel handling and assembling processes, as well as the fuel compact changes under irradiation. In various embodiment, the second radial gap 222 can be in the range of about 0.007 cm to about 0.01 cm. Various other embodiments are envisioned where the second radial gap 222 can be greater than 0.01 cm, such as 0.02 cm, 0.025 cm, or 0.03 cm, as examples. Various other embodiments are envisioned where the second radial gap 222 can be less than 0.007 cm, such as 0.006 cm, 0.005 cm, or 0.004 cm, as examples.

As discussed above, the first radial gap 218 can be defined between the sidewalls 216 of the sleeves 212 and the inner edges 220 of the channels 216 of the graphite support structure 204. Similarly, as discussed above, the second radial gap 222 can be defined between the sidewalls 216 of the sleeves 212 and the radial edges 224 of the nuclear fuel 214. In one aspect, the ratio of the first radial gap 218 size to the second radial gap 222 size can be in the range of about 10:1 to about 30:1. Various other embodiments are envisioned where the ratio of the first radial gap 218 size to the second radial gap 222 size can be less than 10:1, such as 9:1, 7:1, or 5:1, as examples. Various other embodiments are envisioned where the ratio of the first radial gap 218 size to the second radial 222 gap size can be greater than 30:1, such as 32:1, 35:1, or 40:1, as examples.

In one aspect, the first radial gap 218 and the second radial gap 222 can be filled with a gas to both maintain the size of the gaps, while also facilitating heat transfer out of the fuel assemblies 210. In one example embodiment, the first radial gap 218 and the second radial gap 222 can be filled with helium gas. Various other embodiments are envisioned where the first radial gap 218 and the second radial gap 222 are filled with any suitable gas that can assist in facilitating heat transfer out of the fuel assemblies 210.

As shown in FIG. 3, the fuel assemblies 210 can further include a first end cap 226 and a second end cap 230. The first end cap 226 and the second end cap 230 can interface with a first open end 228 of the sleeve 212 and a second open end 232 of the sleeve 212, respectively, to seal the nuclear fuel 214 within the sleeve 212. In various embodiments, the first and second end caps 226, 230 can be press fit into the first and second open ends 228, 232, respectively, to seal the nuclear fuel 214 within the sleeves 212. In various embodiments, the first and second end caps 226, 230 can be welded to the first and second open ends 228, 232, respectively, to seal the nuclear fuel 214 within the sleeves 212. In various embodiments, the first and second end caps 226, 230 can be held against the first and second open ends 228, 232, respectively, to seal the nuclear fuel 214 within the sleeves 212, with a latch mechanism. In various embodiments, the first and second end caps 226, 230 can be comprised of a beryllium-based material, such as BeO or Be2C, as examples, to provide similar benefits as the sleeve 212 in the axial direction relative to the nuclear fuel 214.

In addition, the fuel assemblies 210 can further include axial reflector pellets 234 that are positionable between the first and second end caps 226, 230 and axial edges 236 of the nuclear fuel 214. In one aspect, the axial reflector pellets 234 can be comprised of a beryllium-based material, such as BeO or Be2C, as examples, to provide similar benefits as the sleeve 212 and the end caps 226, 230 in the axial direction relative to the nuclear fuel 214.

It has been found that the above-described beryllium-based sleeve and other modifications described herein provide numerous benefits over the prior art and meet many of the aforementioned requirements related to reactor design and fuel considerations. Previously, beryllium based materials had not been considered in reactor applications due to its low availability and corresponding high costs. In addition, beryllium-based materials had not been considered in reactor application as high neutral flux rates seen in large power reactor applications cause cracking and shape changes in beryllium-based materials. Therefore, lower neutral flux rates found in smaller generators (like microreactors) make beryllium-based materials suitable for use.

As one example of a benefit over the prior art, it has been found that the above-described enhancements provide a reduction of fuel, such as TRISCO fuel, as an example, by ~5-12%. This reduction translates to a reduction of the active fuel length, the reactor core length, and weight of the core and all the surrounding components. In addition, it has also been found, using a 3-D thermo-mechanical analysis with properly modeled heat pipe physical behavior, that the above-described enhancements meet acceptable fuel temperature ranges for the nuclear reactor system. The performance of the nuclear system also meets safety requirements in transient conditions, and in particular, meets the negative power reactivity coefficient.

Moreover, the enhancements can provide protection of the nuclear fuel, such as TRISO fuel, from possible migration of metal isotopes, such as nickel, from the heat pipes, as well as any other metal components within the reactor, including reactor instrumentation. In addition, the beryllium-based sleeve can facilitate assembling of the reactor providing a "container" for the nuclear fuel to be located within each fuel channel of the reactor. Numerous other benefits will be readily apparent by a person having ordinary skill in the art it light of the above-provided disclosure.

Various aspects of the subject matter described herein are set out in the following examples.

Example 1—A reactor unit cell comprising a graphite moderator structure, a heat pipe positioned in the graphite moderator structure and a fuel assembly positioned in the graphite moderator structure, wherein the fuel assembly comprises a beryllium-oxide sleeve and nuclear fuel positioned in the beryllium-oxide sleeve.

Example 2—The reactor unit cell of Example 1, wherein the fuel assembly further comprises a plurality of beryllium-oxide pellets positioned in the beryllium-oxide sleeve.

Example 3—The reactor unit cell of Example 2, wherein the fuel assembly further comprises an end cap coupleable with the beryllium-oxide sleeve, and wherein the beryllium-oxide pellets are positioned between the end cap and the nuclear fuel.

Example 4—The reactor unit cell of any one of Examples 1-3, wherein a radial gap is defined between the nuclear fuel and the beryllium-oxide sleeve.

Example 5—The reactor unit cell of Example 4, wherein the radial gap comprises helium gas.

Example 6—The reactor unit cell of Examples 4 or 5, wherein the radial gap is in the range of about 0.007 cm to about 0.01 cm.

Example 7—The reactor unit cell of any one of Examples 1-6, wherein a radial gap is defined between the fuel assembly and the graphite moderator structure.

Example 8—The reactor unit cell of Example 7, wherein the radial gap comprises helium gas.

Example 9—The reactor unit cell of Examples 7 or 8, wherein the radial gap is in the range of about 0.1 cm to about 0.2 cm.

Example 10—The reactor unit cell of any one of Examples 1-9, wherein the beryllium-oxide sleeve comprises a wall thickness in the range of about 0.15 cm to about 0.4 cm.

Example 11—The reactor unit cell of any one of Examples 1-10, wherein the nuclear fuel comprises TRISO fuel.

Example 12—A reactor unit cell comprising a graphite moderator matrix, a heat pipe positioned in the graphite moderator matrix, and a plurality of fuel assemblies positioned in the graphite moderator matrix, wherein the plurality of fuel assemblies surround the heat pipe, and wherein at least one fuel assembly of the plurality of fuel assembles comprises a sleeve comprised of a beryllium-based material and nuclear fuel positioned in the sleeve.

Example 13—The reactor unit cell of Example 12, wherein the at least one fuel assembly further comprises a plurality of pellets comprised of a beryllium-based material, and wherein the pellets are positioned in the sleeve.

Example 14—The reactor unit cell of Example 13, wherein the at least one fuel assembly further comprises an end cap coupleable with the sleeve, and wherein the pellets are positioned between the end cap and the nuclear fuel.

Example 15—The reactor unit cell of any one of Examples 12-14, wherein a first radial gap is defined between the sleeve and the graphite moderator matrix, wherein a second radial gap is defined between the nuclear fuel and the sleeve, and wherein the first radial gap is different than the second radial gap.

Example 16—The reactor unit cell of Example 15, wherein the first radial gap is in the range of about 0.1 cm to about 0.2 cm, and wherein the second radial gap is in the range of about 0.007 cm to about 0.1 cm.

Example 17—The reactor unit cell of Examples 15 or 16, wherein the first radial gap and the second radial gap comprise helium gas.

Example 18—A nuclear reactor core comprising a plurality of reactor unit cells, wherein at least one of the reactor unit cells comprises a graphite moderator matrix, a plurality of heat pipes positioned in the graphite moderator matrix, and a plurality of fuel assemblies positioned in the graphite moderator matrix, wherein at least one fuel assembly of the plurality of fuel assembles comprises a beryllium-oxide sleeve configured to house nuclear fuel therein.

Example 19—The nuclear reactor core of Example 18, wherein a radial gap is defined between the at least one fuel assembly and the graphite moderator matrix.

Example 20—The nuclear reactor core of Examples 18 or 19, wherein the beryllium-oxide sleeve comprises a wall thickness in the range of about 0.15 cm to about 0.4 cm.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The term "substantially", "about", or "approximately" as used in the present disclosure, unless otherwise specified, means an acceptable error for a particular value as determined by one of ordinary skill in the art, which depends in part on how the value is measured or determined. In certain embodiments, the term "substantially", "about", or "approximately" means within 1, 2, 3, or 4 standard deviations. In certain embodiments, the term "substantially", "about", or "approximately" means within 50%, 20%, 15%, 10%, 9%, 8%, 7%, 6%, 5%, 4%, 3%, 2%, 1%, 0.5%, or 0.05% of a given value or range.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A reactor unit cell, comprising:
a graphite moderator structure;
a heat pipe positioned in the graphite moderator structure; and
a fuel rod positioned in the graphite moderator structure, wherein the fuel rod comprises:
a beryllium-oxide sleeve; and
nuclear fuel positioned in the beryllium-oxide sleeve, wherein the beryllium-oxide sleeve directly surrounds the nuclear fuel such that the beryllium-oxide sleeve provides protection to the nuclear fuel from migrating metal isotopes from the heat pipe.

2. The reactor unit cell of claim 1, wherein the fuel rod further comprises a plurality of beryllium-oxide pellets positioned in the beryllium-oxide sleeve.

3. The reactor unit cell of claim 2, wherein the fuel rod further comprises an end cap coupleable with the beryllium-oxide sleeve, and wherein the beryllium-oxide pellets are positioned between the end cap and the nuclear fuel.

4. The reactor unit cell of claim 1, wherein a radial gap is defined between the nuclear fuel and the beryllium-oxide sleeve.

5. The reactor unit cell of claim 4, wherein the radial gap comprises helium gas.

6. The reactor unit cell of claim 4, wherein the radial gap is in the range of 0.007 cm to 0.01 cm.

7. The reactor unit cell of claim 1, wherein a radial gap is defined between the fuel rod and the graphite moderator structure.

8. The reactor unit cell of claim 7, wherein the radial gap comprises helium gas.

9. The reactor unit cell of claim 7, wherein the radial gap is in the range of 0.1 cm to 0.2 cm.

10. The reactor unit cell of claim 1, wherein the beryllium-oxide sleeve comprises a wall thickness in the range of 0.15 cm to 0.4 cm.

11. The reactor unit cell of claim 1, wherein the nuclear fuel comprises TRISO fuel.

12. The reactor unit cell of claim 1, wherein the beryllium-oxide sleeve directly surrounds the nuclear fuel such that the beryllium-oxide sleeve further provides neutron moderation to the nuclear fuel and a reactivity contribution to the nuclear fuel.

13. A reactor unit cell, comprising:
a graphite moderator matrix;
a heat pipe positioned in the graphite moderator matrix; and
a fuel rod positioned in the graphite moderator matrix, wherein the fuel rod comprises a beryllium-oxide sleeve, wherein nuclear fuel is positionable in the beryllium-oxide sleeve, wherein the beryllium-oxide sleeve directly surrounds the nuclear fuel such that the beryllium-oxide sleeve provides protection to the nuclear fuel from migrating metal isotopes from the heat pipe.

14. The reactor unit cell of claim 13, wherein the fuel rod further comprises a plurality of beryllium-oxide pellets positioned in the beryllium-oxide sleeve.

15. The reactor unit cell of claim 14, wherein the fuel rod further comprises:
the nuclear fuel; and
an end cap coupleable with the beryllium-oxide sleeve, wherein the beryllium-oxide pellets are positioned between the end cap and the nuclear fuel.

16. The reactor unit cell of claim 13, further comprising the nuclear fuel, wherein a radial gap is defined between the nuclear fuel and the beryllium-oxide sleeve.

17. The reactor unit cell of claim 16, wherein the radial gap comprises helium gas.

18. The reactor unit cell of claim 16, wherein the radial gap is in the range of 0.007 cm to 0.01 cm.

19. The reactor unit cell of claim 13, wherein a radial gap is defined between the fuel rod and the graphite moderator matrix.

20. The reactor unit cell of claim 19, wherein the radial gap comprises helium gas.

21. The reactor unit cell of claim 19, wherein the radial gap is in the range of 0.1 cm to 0.2 cm.

22. The reactor unit cell of claim 13, wherein the beryllium-oxide sleeve directly surrounds the nuclear fuel such that the beryllium-oxide sleeve further provides neutron moderation to the nuclear fuel and a reactivity contribution to the nuclear fuel.

* * * * *